Patented Aug. 13, 1940

2,211,709

UNITED STATES PATENT OFFICE 2,211,709

TRIAZINE-ALDEHYDE RESINOUS CONDENSATION PRODUCTS

Werner Zerweck and Karl Keller, Frankfort-on-the-Main-Fechenheim, Germany, assignors to I. G. Farbenindustrie Aktiengesellschaft, Frankfort-on-the-Main, Germany No Drawing. Application September 24, 1938, Serial No. 231,560. In Germany May 22, 1936

4 Claims. (Cl. 260—72)

Our U. S. application Serial No. 124,034, filed February 4, 1937, relates to resinous condensation products and process of making same.

Our present invention is a continuation in part of the said application and relates to resinous condensation products and process of making same more particularly to those obtained by condensing a low aliphatic aldehyde containing a chain of at the most 6 carbon atoms, particularly formaldehyde, or other compounds splitting off aldehydes with compounds of the general formula:

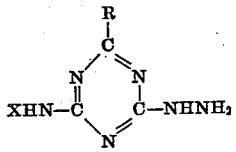

wherein X stands for a member of the group consisting of hydrogen and NH$_2$, R for a member of the group consisting of a further hydrazino-, a phenyl-, hydroxy-, alkoxy-, thioether group and halogen.

One molecular weight of the above compound is treated with at least one molecular weight of the aldehyde. The condensation may be carried out in neutral, acid or alkaline condition, in the cold or in the hot and in organic or inorganic liquids or molten masses. Further on the condensation may be performed without additions of other substances and the condensation product thus obtained may be mixed with filling materials and dyestuffs, or the condensation may be carried out in the presence of fillers and dyestuffs. The condensation is accelerated by the addition of acids or acid-forming compounds, whereas it is retarded by the addition of alkalies and organic bases.

Beside the above compound there may be added to the condensation mixture other compounds which are capable of condensing with aldehydes such for example as urea, thiourea, substituted ureas, polymethylene-ureas, dicyandiamide, guanidine, sugars of all kinds, sulphonamides, mono- or poly-carboxylic acid amides, aminobenzenes, phenols, etc. The resins thus obtained may be employed in admixture with other natural or artificial resins such for example as phenol, urea, aniline, alkyl and ketone resins.

The present condensation products are singularly valuable substances because they combine the good properties of electric insulation and high resistance to water of the known aniline-formaldehyde resins with the colorlessness and resistance to light of the urea resins. They may be heated to 200° and more without decomposition, they are very resistant even to boiling water and hot water vapour and they are colorless and stable to light. They are particularly suitable for the manufacture of moulded articles because in the hot moulding press they pass over quickly into their final state. They are therefore particularly adapted for the manufacture of gramophone records. Just as with the known hardening artificial resins the new products can be worked up with various kinds of fillers and dyestuffs, and they show great stability and resistance to heat and light, even when employed with organic fillers. The finished moulded articles are distinguished by absence of scent and taste. For being employed for electrical engineering they have the advantage of a very good insulating power and other good electric properties, particularly a good resistance to surface leakage current. They are therefore especially adapted for the manufacture of objects of electric insulation and construction, which are often or for a long time exposed to temperatures of 100° and more, such as parts of switches, lamp-pedestals and lamp-shades, contacts of flatirons, bearing-dishes, particularly of boxes for wireless apparatus, moreover for the manufacture of vessels and utensils which are often or for a long time exposed to aqueous liquors, such as cups, bowls, cans, boxes particularly for soap buttons, vases, domestic utensils of various kind, medical and sanitary articles, sets of teeth, coatings for tables and pieces of furniture and the like. Moreover they may be used as fire protecting agents, particularly when a sugar has been added during or after the condensation reaction.

When the new resins are employed as lacquers and impregnating agents, coatings resistant to water and light are formed in a short time with or without heating. Moreover the new resins are suitable for gluing and cementing of various articles.

In order to further illustrate our invention the following examples are given, the parts being by weight and all temperatures in degrees centigrade.

Example 1

While stirring 100 parts of cyanurtrihydrazide of the formula:

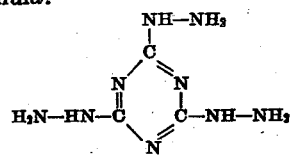

are dissolved in 140 parts of formaldehyde of 40% strength taking care, if necessary, for removing the heat formed by the reaction. The aqueous solution of the resin thus obtained is immediately useful as binding agent for impregnating, coating, gluing and the like. A particular hardening is not necessary since the resin is converted already at room temperature within few hours into the final state. In some cases the hardening may be accelerated by adding an acid or it may be retarded by adding an alkaline acting agent or an alcohol. In the state of conversion of the resin pressed articles may be formed by the action of pressure with or without heating.

Similar products are obtained by starting from amino-ethoxy-hydrazino-cyanidine of the formula:

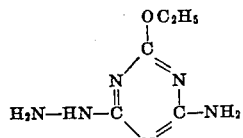

or of hydroxy-dihydrazino-cyanidine of the formula:

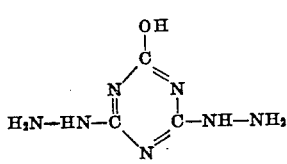

By using instead of 140 parts of formaldehyde of 40% strength 60–70 parts of acetaldehyde in presence of about the double quantity of water a condensation product is obtained which is easily soluble in water. After evaporation of the water it is converted by further heating into a higher molecular state.

It can be used in a similar manner as the product obtained with formaldehyde.

Example 2

17 parts of cyanurtrihydrazide are stirred with a mixture of about 90 parts of water and 160 parts of alcohol, then 22 parts of butyraldehyde are added and the mixture is boiled in an apparatus provided with a reflux condenser, until solution occurs. Then some impurities are removed by filtration and the filtrate is evaporated. A pulverizable mass is obtained, which is soluble in hot alcohol. When pouring the alcoholic solution on surfaces of glass or metal after evaporation of the alcohol a transparent lacquer is obtained.

In the same manner cyanurtrihydrazide may be condensed with hexahydrobenzaldehyde.

Example 3

17 parts of cyanur-trihydrazide are extremely finely powdered and stirred at about 50° with 65 parts of water. Then a solution of 25 parts of crotonaldehyde in about 130 parts of alcohol is added and the mixture is heated in an apparatus provided with a stirrer and a reflux condenser until the mass has been dissolved. Some impurities are removed by filtration, the alcohol and water are expelled by evaporation. The residual resinous product is then heated for some time at about 100°. A yellowish waterinsoluble condensation product is obtained.

Instead of crotonaldehyde one may use hexylaldehyde.

Example 4

19 parts of a dihydrazinocompound (corresponding to methylthioameline) of the formula:

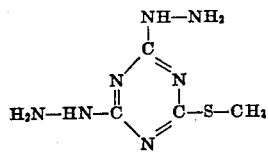

which may be prepared in an analogous manner as described for the manufacture of methylthioammeline (cf. Ber. Deutsch. Chem. Ges., vol. 18, page 2757) by heating trithiocyanuric acid trimethylester with anhydrous alcoholic hydrazine for some hours at 150 to 160°, are mixed with about 2 to 4 molecular proportions of formaldehyde in the form of a neutral aqueous solution of about 35% strength, about 1 part of triethanol amine and 0.1 part of magnesium carbonate (as stabilizator) and the mixture is stirred at about 60 to 65°, until solution occurs. Then to this solution a pulp of 20 parts of cellulose and 20–40 parts of water are added, the mass is dried and milled. In this manner a white moulding powder is obtained which can be worked up at temperatures above 100° easily to articles which are very resistant to water.

Example 5

21.5 parts of a dihydrazino compound of the formula

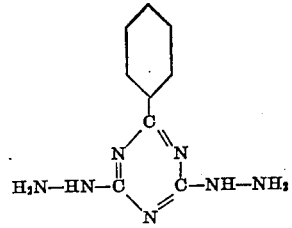

obtainable by heating for 6 to 8 hours at 150° to 155° benzo-guanamine with an excess of hydrazine hydrate are mixed with about 45 parts of butanol and 15 parts of toluene. At about 90 to 95° to such a mixture 45 parts of a neutralized formaldehyde solution of 30% strength and 2 parts of pyridine are added while stirring, whereby a simultaneous azeotropic distillation occurs, which is continued after the addition of 0.2 part of phthalic acid anhydride until a total dehydration. Finally the solvent is distilled off until the desired concentration. A clear and transparent lacquer solution is obtained which may be diluted with any solvent and yields hard and bright coats of a good resistance to water.

Example 6

16 parts of monochloro-hydrazino-cyanuric-amide of the formula:

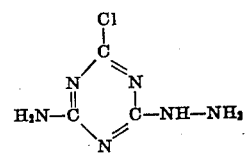

are mixed with an excess of a neutralized formaldehyde solution of 30% strength and a little quantity of pyridine, and the mixture is stirred at about 70°, until solution occurs. The evaporated solution yields a yellowish resin, which can be hardened at about 80°.

The aforesaid monochloro hydrazino-cyanuric amide may be prepared for instance as follows:

18.5 parts of cyanuric chloride are dissolved in about 150 parts of acetone. To the solution, which is cooled down to —5°, 52 parts of an aqueous ammonia solution containing 3.4 parts of ammonia, and then, while increasing the temperature to about 15°, 12 parts of hydrazine hydrate are added. The reaction mass is held for some hours at 15 to 20°. The reaction prod-

We claim:

1. Resinous condensation products obtained by condensing a low aliphatic aldehyde containing a chain of at the most 6 carbon atoms with a compound of the general formula:

wherein X stands for a member of the group consisting of hydrogen and NH₂, R for a member of the group consisting of a further hydrazino-, a phenyl-, hydroxy-, alkoxy-, thioether group and halogen.

2. A resinous condensation product obtained by condensing formaldehyde with cyanurtrihydrazide of the formula:

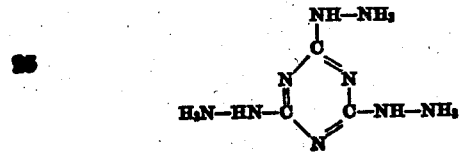

3. A resinous condensation product obtained by condensing formaldehyde with a dihydrazino compound of the formula:

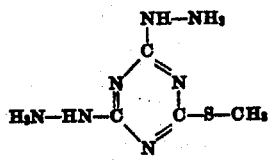

4. A resinous condensation product obtained by condensing formaldehyde with a dihydrazino compound of the formula:

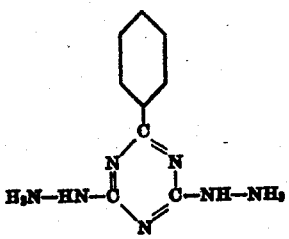

WERNER ZERWECK.
KARL KELLER.